United States Patent [19]

Kato et al.

[11] Patent Number: 4,477,899
[45] Date of Patent: Oct. 16, 1984

[54] DIGITAL DATA TRANSMISSION SYSTEM WITH TIME DIVISION/PACKET TRANSFORMATION FUNCTION

[75] Inventors: Takao Kato, Yokohama; Tetsuo Takemura, Kamakura, both of Japan

[73] Assignee: Hitachi, Ltd., Tokyo, Japan

[21] Appl. No.: 368,661

[22] Filed: Apr. 15, 1982

[30] Foreign Application Priority Data

Apr. 17, 1981 [JP] Japan ............................. 56-57217

[51] Int. Cl.³ ............................................. H04J 3/00
[52] U.S. Cl. ........................................ 370/94; 370/60
[58] Field of Search ..................... 370/94, 60, 92, 70

[56] References Cited

U.S. PATENT DOCUMENTS 4,324,000 4/1982 Ali ............................................. 370/92

OTHER PUBLICATIONS

"Proceedings of the Fourth International Conference on Computer Communication", Kyoto, Sep. 26-29, 1978, pp. 583-588.
Computer Design, vol. 15, No. 6, pp. 83-88, Jun. 1976, "Packet Switching Combines Two Techniques in one Network" by J. de Snet et al.

*Primary Examiner*—Douglas W. Olms
*Assistant Examiner*—Frank M. Scutch, III

[57] ABSTRACT

A digital data transmission system with a transmultiplexer arrangement for interconnection of a time division multiplex line and a packet multiplex line. The transmultiplexer has a section which converts data for each of a plurality of terminals on the time division multiplex line in the unit of a packet, for allocation on the packet multiplex line, and a section which identifies the time position of each data unit on the time division multiplex line, prepares a specific packet containing the position information and allocates the specific packet before the data packet on the packet multiplex line. The transmultiplexer also has a section which periodically allocates data on the packet multiplex line allotted with a specific packet containing position information of a terminal before a data packet corresponding to the terminal on the time division multiplex line in accordance with the position information of the terminal.

6 Claims, 6 Drawing Figures

DIGITAL DATA TRANSMISSION SYSTEM WITH TIME DIVISION/PACKET TRANSFORMATION FUNCTION

BACKGROUND OF THE INVENTION

1. Field of the Invention

The present invention relates to a digital data transmission system in a communication network in which both a time division multiplex line and packet multiplex line are provided, and more particularly to a transmultiplexer arrangement adapted to interconnect the time division multiplex line and the packet multiplex line.

2. Description of the Prior Art

Conventionally, when providing a time division multiplex line in a packet network, the contents of the time division multiplex line are first demultiplexed to individual channels corresponding to respective terminals so that the channels are connected to line terminators through physically independent individual lines. FIG. 1 shows a block diagram for explaining the manner of providing a time division multiplex line in a conventional system. In FIG. 1, a time division multiplex line 151 of a PCM first-order (primary) group in which the bit rate is 1,544 Mb/s (or 2,048 Mb/s), that is, 64 Kb/s×24 (or 64 Kb/s×32) forms a transmission path which is divided into multiplex lines 152-1 to 152-l of a PCM zero-order group of 64 Kb/s by means of a 01 multiplexer demultiplexer (01 MUX) 101. In the 64 Kb/s PCM zero-order group, data corresponding to a plurality of terminals are multiplexed in accordance with a multi-frame format pursuant to the CCITT Recommendation X. 50 (6+2 envelope scheme). For example, data of 20 terminals having a bearer rate of 3.2 Kb/s or of 5 terminals having a bearer rate of 12.8 Kb/s are multiplexed in a single 64 Kb/s line. Thus, each of the time division multiplex lines 152-1 to 152-l of the PCM zero-order group is divided into independent terminal lines 153-1-1 to 153-l-m and loaded to corresponding line terminators of a packet exchange 180. By the air of high speed signal control equipment 103 of the packet exchange 180, data on the terminal lines 153 respectively corresponding to the individual terminals is transferred, in the unit of a fixed bit number, via a bus 154 to a main memory 104 for storage therein at positions corresponding to loading positions of the lines. When reception of one frame or one packet from a particular terminal line 153 is completed, a controller 105 is informed of the completion of data reception by means of the high speed signal control equipment 103. The controller 105 then analyzes a header part of the packet stored in the main memory 104 and instructs the high speed signal control equipment 103 to send the header part to a packet multiplex line 155 on a destination path. The thus instructed high speed signal control equipment 103 operates to send the packet in the main memory 104 to a designated packet multiplex line 155 via the bus 154. Conversely, data from the packet multiplex line 155 may be sent to the time division multiplex line 151 via the independent terminal lines by processing reverse to the aforementioned one.

As described above, when supporting the time division multiplex line in the packet network in the conventional system, the multiplex line is demultiplexed to individual channels corresponding to respective terminals and thereafter coupled to the exchange with the result that a number of line terminators of the packet exchange are required, corresponding to the number of the independent line terminators. Consequently, although the packet exchange is featured by efficient exchange of data of terminals having high bit rate and low traffic characteristics, the existing packet exchange which requires the same number of line terminators as the terminals even when the terminals have a low traffic prevents the provision of an economical packet switching system.

SUMMARY OF THE INVENTION

An object of this invention is to provide a digital data transmission system capable of supporting a time division multiplex line in a packet exchange with high efficiency and economy.

Another object of this invention is to provide a digital data transmission system capable of supporting a packet multiplex line in a time division exchange with high efficiency and economy.

Still another object of this invention is to provide a transmultiplexer arrangement which is adapted to interconnect the time division multiplex line and the packet multiplex line without loss of terminal information and with economy.

Yet another object of this invention is to provide a transmultiplexer arrangement of high reliability and flexibility which is capable of converting data on the time division multiplex line having various levels of multiplexing and various signal formats into a packet multiplex signal without losing character synchronization.

According to this invention, to accomplish the above objects, a transmultiplexer arrangement for transforming the data of a time division multiplex channel to data for a packet multiplex channel, and vise versa, is provided between the time division multiplex line and the packet multiplex line, and the arrangement includes means for allocating a packet relating to a terminal containing information regarding the sequence of terminals on a time division multiplex line to the precedence of a packet signal on the packet multiplex line corresponding to a time division signal on the time division multiplex line relating to the terminal.

DESCRIPTION OF THE PREFERRED EMBODIMENTS

Figure 2:
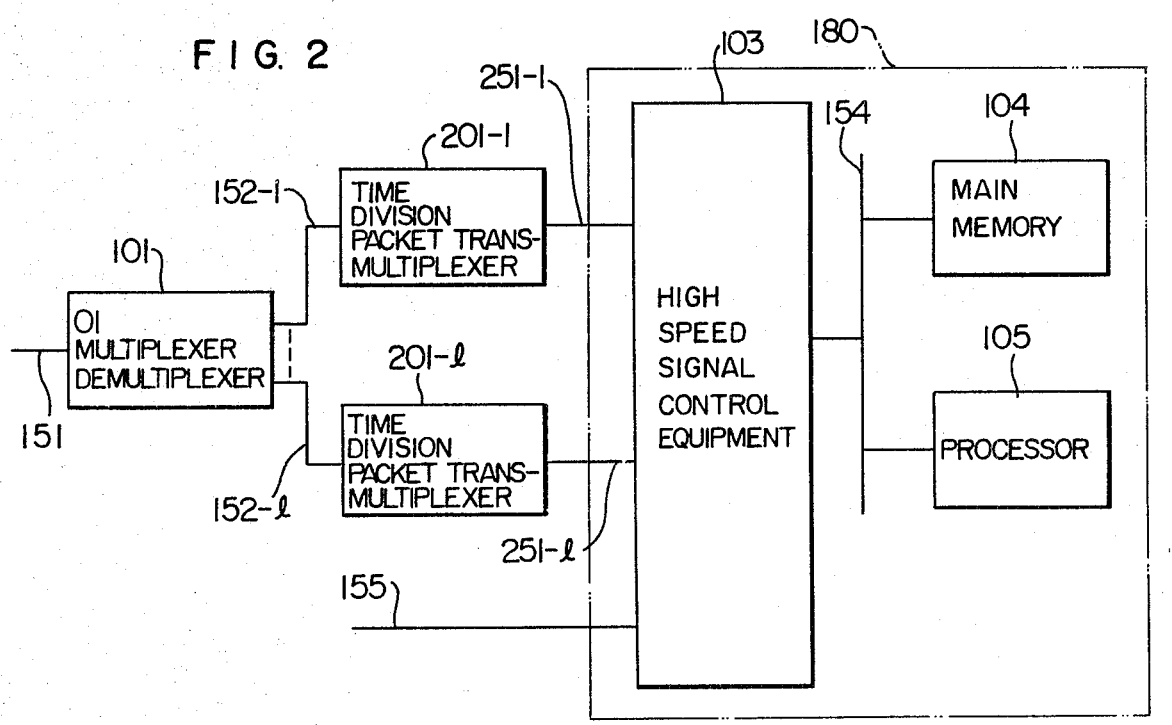
FIG. 2 is a block diagram of a system incorporating the present invention for supporting the time division multiplex line in a packet exchange.

Referring now to FIG. 2, there is shown a preferred embodiment of a system according to this invention which is adapted to support the time division multiplex line in the packet exchange by using a time division/packet transmultiplexer arrangement. In FIG. 2, what is mainly different from the conventional system of FIG.

1 is that the number of lines to be handled by the high speed signal control equipment 103 included in the packet exchange 180 can be reduced by the use of a time division/packet transmultiplexer arrangement 201.

Figure 1:
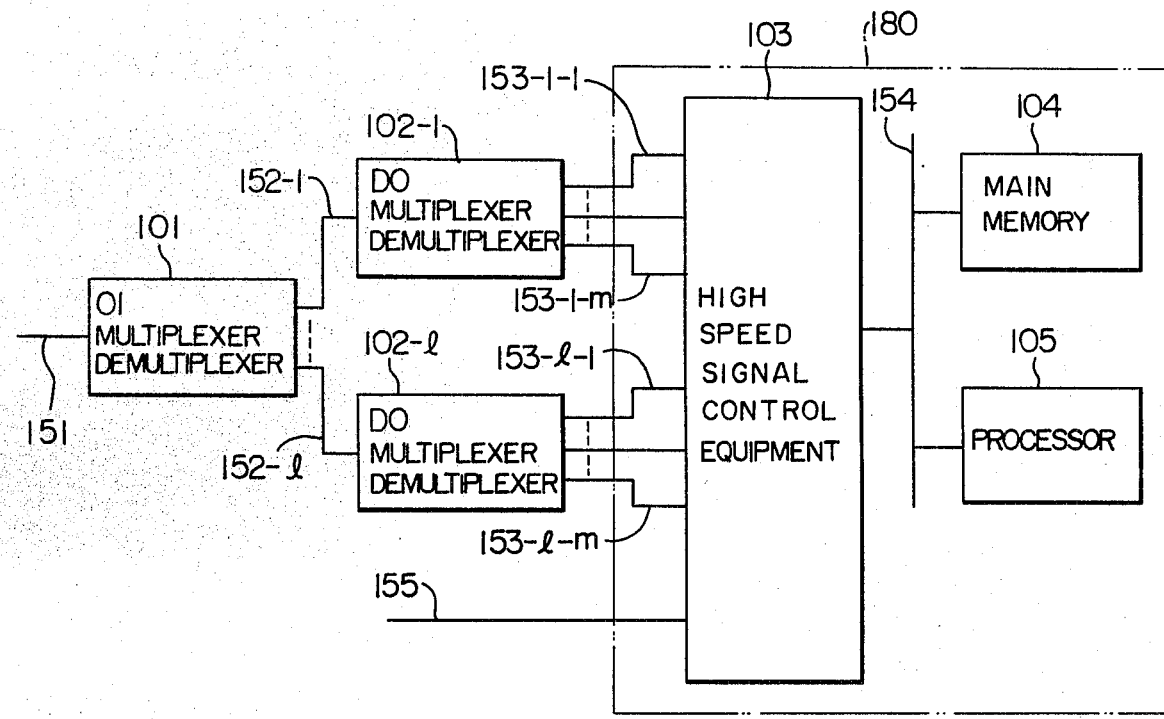
FIG. 1 is a block diagram of a conventional system for supporting the time division multiplex line in a packet exchange.

Like the system of FIG. 1, a multiplex line 151 of a PCM first-order group is first divided into multiplex lines 152-1 to 152-l of a PCM zero-order group of a frame format pursuant to the CCITT Recommendation X.50 by means of a 01 multiplexer demultiplexer (01MUX) 101. Thereafter, the zero-order group multiplex lines 152-1 to 152-l of the Recommendation X.50 are coupled to time division/packet transmultiplexers 201-1 to 201-l, respectively. In each of the time division/packet transmultiplexers 201-1 to 201-l, the terminal position is discriminated by a distance n from a frame bit (FB) pursuant to the X.50 frame format on each of the multiplex lines 152-1 to 152-l, and a packet 602 is set up for each terminal (for example, 20 terminals for a terminal bearer rate of 3.2 Kb/s). After completion of the establishment of the packets, the frames or packets 602 associated with the respective terminals are sent to corresponding packet multiplex lines 251-1 to 251-l. However, a packet 601 containing the distance "n" from the FB position indicative of the terminal position information is prepared and sent out immediately before the sending of the packet 602.

A packet switchboard 180 receives from each of the packet multiplex lines 251-1 to 251-l the packet 601 containing the terminal position information and the packet 602 of the terminal. Then, the exchange 180 identifies a particular terminal on the basis of the particular terminal position information provided in the packet 601, prepares a header necessary for sending the packet to a destination corresponding to the particular terminal, and sends the packet containing the header to the packet multiplex line 155. This processing is similarly executed for data corresponding to any of the terminal positions on the time division multiplex lines 152-1 to 152-l.

The operation of the time division/packet transmultiplexer arrangement 201 of FIG. 2 will now be described in greater detail with reference to FIGS. 4 to 6.

Figure 4:
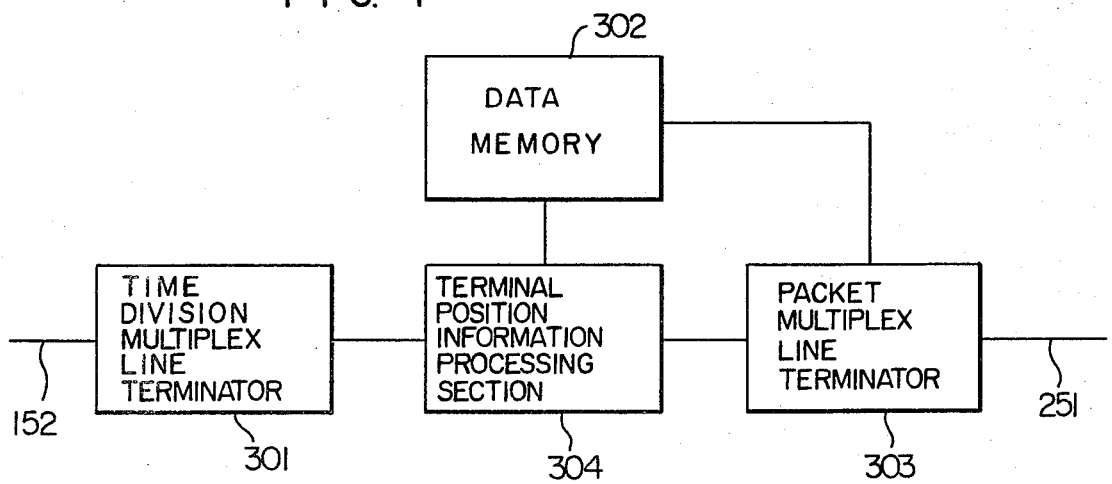
FIG. 4 is a block diagram of a time division/packet transmultiplexer arrangement embodying the invention.

One transmultiplexer embodying the invention comprises component blocks as shown in FIG. 4. In this figure, terminal data sent on the time division multiplex line 152 is received by a time division multiplex line terminator 301. The received data (comprised of flag pattern FP, address field A, control field C, data field DATA and error control code CRC) is stored, at locations corresponding to the respective terminals, in a data memory 302 via a terminal position information processing section 304. The terminal position is identified by the time division multiplex line terminator 301 and the identified terminal position information (n) is also sent to the terminal position information processing section 304. When the terminal position information processing section 304 recognizes from the received data the completion of reception of data corresponding to one packet, it informs a packet multiplex line terminator 303 of the corresponding terminal position information and at the same time, instructs not only the data memory 302 to send out the packet 602 stored therein, but also causes the packet multiplex line terminator 303 to prepare and send out the packet 601 containing the terminal position information corresponding to the packet 602 immediately before the sending of the packet 602. In this manner, the packet multiplex line terminator 303 delivers the packet 601 containing the terminal position information onto a packet multiplex line 251 with terminal position information.

Figure 3:
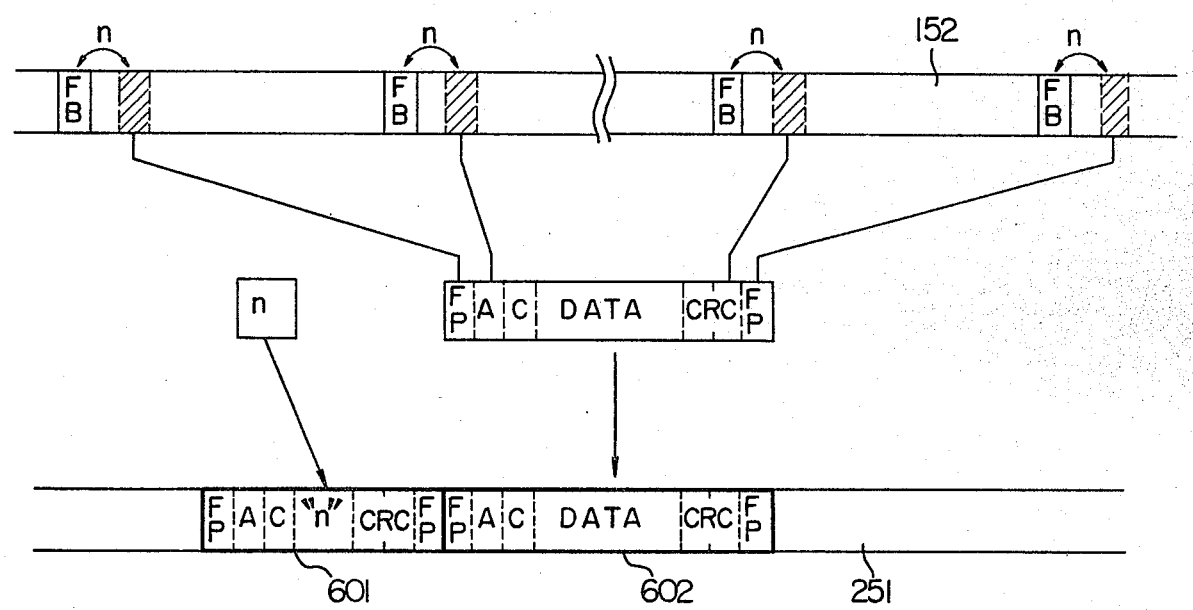
FIG. 3 is a diagrammatic representation useful in explaining the transfer of data on the time division multiplex line to a packet multiplex line with terminal position information in accordance with the invention.
Figure 5:
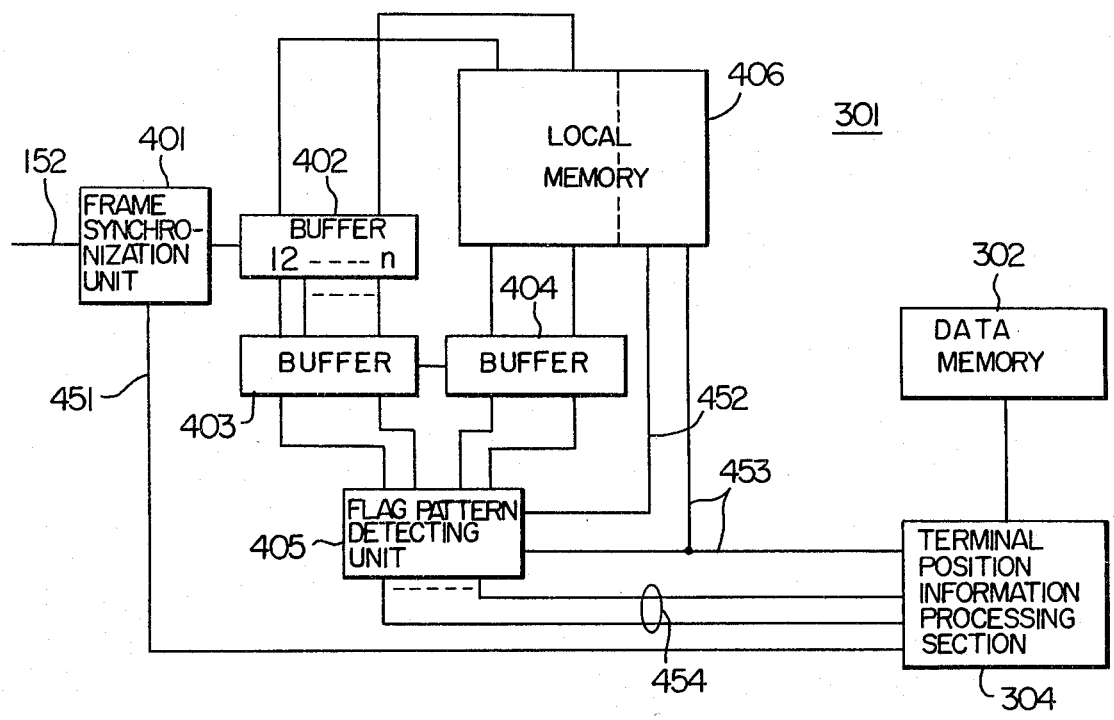
FIGS. 5 and 6 are block diagrams showing details of component circuits in the arrangement of FIG. 4.

Exemplified in FIG. 5 is the time division multiplex line terminator 301 in FIG. 4. As shown in FIG. 5, time division multiplex data from the time division multiplex line 152 having the X.50 frame format as shown in FIG. 3 is received by a frame synchronization unit 401 in which the frame synchronization is established and the distance n from the X.50 frame bit FB is identified for each terminal data. This information indicative of the distance n from the X.50 frame bit FB corresponding to the terminal is sent to the terminal position information processing section 304 together with the data via a lead 451.

The terminal data (such as FP, A, C, DATA, CRC) is received by a buffer 402 via the synchronization unit 401 and is immediately stored on the one hand in a terminal correspondent area of a local memory 406 and is transferred on the other hand to a buffer 403. The terminal data which has been stored in the area corresponding to the terminal during one preceding period is read from the local memory 406 and loaded into a buffer 404. A flag pattern detecting unit 405 searches the buffers 403 and 404 to detect a flag pattern FP "01111110" indicative of the head of the packet in the two buffers and determines how many bits the position of the header bit is displaced by from the head bit of the data within the buffer 404. This displacement or a forward displacement is stored in an area of the local memory corresponding to the terminal via a lead 452. At this time, the flag pattern detecting unit 405 sends to the terminal position information processing section 304 the flag pattern FP via a lead 454 together with the preceding terminal position information sent via the lead 451. During the succeeding period, the flag pattern detecting unit 405 reads the forward displacement previously stored from the local memory 406 in order to set up the character synchronization. Data (such as address field A) at a position which is displaced by this forward displacement from the header received by the buffer 404 during the preceding period is sent along with the terminal position information by the flag pattern detecting unit 405 to the terminal position information processing section 304 via the lead 454. While containing this operation during each period, the flag pattern detecting unit 405 searches for a succeeding flag pattern FP indicative of the end of the packet. When the detecting unit 405 detects the flag pattern indicative of the end after the passing of several periods, it stores a displacement of the flag pattern from the head bit received by the buffer 404 (called a backward displacement) into the local memory 406 via a lead 453 and at the same time, sends the backward displacement to the terminal position information processing section 304.

During the succeeding period, the contents of the backward displacement in the local memory 406 is shifted to the position of the forward displacement and is used for the forward displacement for setting up synchronization for the succeeding frame.

When receiving the terminal position information and the terminal data from the terminal representative of the packet from the time division multiplex line terminator section 301 via the leads 451 and 454, the terminal position information processing section 304 stores the terminal data into an area of the data memory 302 corresponding to the terminal position information at a predetermined period. The processing section 304 also judges from the received terminal data the number of bytes of the frame or packet to be sent out. On the other hand, when receiving the backward displacement (indicative of the completion of reception of the packet) via the lead 453, the terminal position information processing section 304 calculates a valid data bit at the last received data and informs the packet multiplex line terminator 303 of the result. At the same time, the processing section 304 informs the section 303 of the corresponding terminal position information and sends the number of bytes of the packet to be sent out to the section 303, thus instructing the section 303 to send out the packet.

Figure 6:
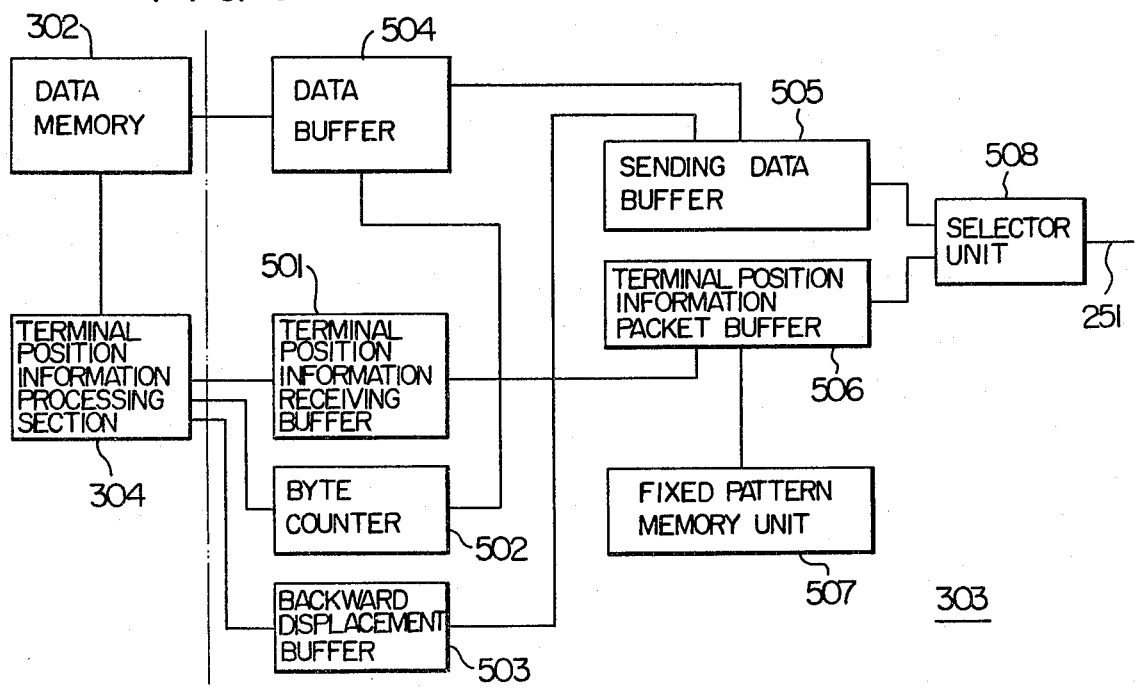

FIG. 6 shows, in block form, details of the packet multiplex line terminator 303 in FIG. 4. In FIG. 6, the packet multiplex line terminator 303 comprises a terminal position information receiving buffer 501 for receiving the terminal position information from the terminal position information processing section 304, a byte counter 502 connected to receive the number of bytes of the packet to be sent out, and a backward displacement buffer 503 connected to receive the valid data bit at the final data byte.

In advance of sending the packet, fixed codes (flag pattern FP, address field A, control field C) of the terminal position indicating packet (601 in FIG. 3) are read out of a fixed pattern memory unit 507. Thereafter, the contents of the terminal position information receiving buffer 501 (the terminal position information "n") and the error control codes CRC are added to the information field DATA and the like to prepare the terminal position indicating packet 601, as shown in FIG. 3, which in turn is loaded into a terminal position information packet buffer 506. The packet 601 is then sent to the packet multiplex line 251 with terminal position information 251 via a selector unit 508. Subsequently, the packet from the terminal is sequentially read out of an area of the data memory 302 corresponding to the terminal position information on the basis of the value of the byte counter 502 and stored in a data buffer 504. Thereafter, the packet (602 in FIG. 3) is sent to the packet multiplex line 251 via sending data buffer 505 and selector unit 508 in a similar manner. The sending of the final byte is then stopped dependent on the value of the backward displacement buffer 503. It will be appreciated that the insertion of the flag pattern FP between the packets 601 and 602 as shown in FIG. 3 is not essential but the final FP of the packet 601 may also play the role of the initial FP of the packet 602. Further, although in the previous embodiment the packet with terminal position information is allocated ahead of the data packet on the packet multiplex line, it may be allocated behind the data packet. In this case, the packet is first read out of the data memory 302 and thereafter, the terminal position information indicating packet is sent out of the terminal position information packet buffer 506.

The operation has been described so far wherein the data from the time division multiplex line 152 is transferred to the packet multiplex line with terminal position information 251. But, obviously, a reverse operation for transfer of the data from the packet multiplex line with terminal position information 251 to the time division multiplex line 152 may be accomplished by processing which is reverse to the above operation.

More particularly, with reference to FIGS. 3 and 4, the information position indicating frame or packet 601 and the packet 602 from the packet multiplex line with terminal position information 251 are received by the packet multiplex line terminator 303.

The packet multiplex line terminator 303 removes the fixed codes (FP, A, C, CRC) and derives the terminal position information "n" from the received information position indicating packet 601 and informs the terminal position information processing section 304 of the result. On the other hand, the section 303 divides the data frame or packet 602 into a predetermined number of bits of a unit and stores them into the data memory 302.

The terminal position information processing section 304 sends the received terminal position information to the time division multiplex line terminator 301 at each unit of the predetermined bit numbers. Thereafter, the time division multiplex line terminator 301 responds to the terminal position information to allocate bits of the packet to the position at a distance of n from the frame bit on the time division multiplex line 152 pursuant to the X.50 frame format, and sends out the packet of allocated bits at predetermined periods.

In this manner, the data is transferred from the packet multiplex line with terminal position information 251 to the time division multiplex line 152.

While in the foregoing description the time division multiplex line has been explained by referring to the PCM zero-order group 64 Kb/x line of the frame format pursuant to the CCITT Recommendation X.50 as an example, the invention may obviously be applicable to the time division multiplex line of the PCM first-order group or the periodic allocation format in which data for each terminal is periodically allocated every predetermined number of bits.

As has been described, in contrast to the conventional system which requires the physical division of the time division multiplex line into the respective terminal lines when supporting the time division multiplex line in the packet exchange, the system of the present invention using the time division/packet transmultiplexer arrangement can support the time division multiplex line in the packet exchange through the single packet multiplex line with terminal position information without dividing the time division multiplex line into a plurality of terminal lines, thereby reducing the hardware of the subscriber correspondent section considerably. This advantage is emphasized as the number of multiplexing levels increases.

The time division/packet multiplexer arrangement of the invention is also applicable when supporting the packet multiplex line in the time division line exchange.

We claim:

1. A digital data transmission system comprising:
a time division multiplex line;
a packet multiplex line; and
a transmultiplexer connected between the time division multiplex line and the packet multiplex line, said transmultiplexer receiving data on said time division multiplex line in which data for a plurality of terminals is serially and periodically allocated every predetermined number of bits in a predetermined sequence of the terminals, delivering out data on said packet multiplex line in which the data for the plurality of terminals received from said time division multiplex line is converted into a plurality of units of a packet and allocating, before or behind the packet on the packet multiplex line, a specific packet containing information regarding the sequence of the terminals relating to said packet on said time division multiplex line.

2. A digital data transmission system comprising:
a packet multiplex line;
a time division multiplex line; and
a transmultiplex arrangement connected between the packet multiplex line and the time division multiplex line, said arrangement receiving data on said packet multiplex line in which data for a plurality of terminals is allocated in the unit of a packet on a time base, delivering out data on said time division multiplex line in which the data for the plurality of terminals received from said packet multiplex line is serially and periodically allocated every predetermined number of bits, and determining the sequence when the data for the respective terminals is periodically allocated on said time division multiplex line in accordance with terminal position information contained in a specific packet which is allocated before or behind the packet for the data of the respective terminals.

3. A transmultiplexer arrangement connected between a time division multiplex line and a packet multiplex line for converting a time division multiplex signal into a packet multiplex signal comprising:
time division multiplex signal receiving means for receiving time division multiplex data transmitted through the time division multiplex line, judging the position of data for each channel on a time base, and delivering out the data received periodically in correspondence to each channel and position information corresponding to the data;
data storage means for storing, in the unit of a packet on the basis of the position information, the data for each channel received from said time division multiplex signal receiving means at predetermined periods; and
packet multiplex signal sending means for reading the data for each channel stored in said storage means in the unit of a packet and sending the read out data to the packet multiplex line, and preparing a specific packet containing the position information of said data and sending out the specific packet.

4. A transmultiplexer arrangement according to claim 3 wherein said time division multiplex signal receiving means comprises:
means for setting up the frame synchronization of the received time division multiplex data and indentifying, in each data of predetermined bit number, a distance from a frame bit position on the multiplex line; and
means for storing the periodically received data in correspondence to each channel and for searching flag patterns respectively indicative of the head and end of the packet to detect the position of the head and end.

5. A transmultiplexer arrangement according to claim 3 wherein said packet multiplex signal sending means comprises:
means for storing a fixed pattern of the specific packet indicative of the position information;
means for adding the position information of the data for each channel to the fixed pattern to prepare said specific packet; and
means for sending said specific packet to the packet multiplex line and thereafter sending out the packet of the data for each channel stored in said data storage means and corresponding to said specific packet.

6. A digital data transmission system comprising:
a time division multiplex line on which data from a plurality of terminals is serially and periodically allocated every predetermined bit number in a predetermined sequence, and data for one packet from each terminal is divided and allocated periodically;
a packet multiplex line on which data from the plurality of terminals is allocated in the unit of packet on a time base, and a specific packet containing information regarding the position of each terminal on said time division multiplex line is allocated before the packet of the data from each terminal;
a transmultiplexer connected between said time division multiplex line and packet multiplex line, for mutually converting the data on said time division multiplex line and the data on said packet multiplex line in the unit of each terminal and, for each terminal, making correspondence between the time position on the time division multiplex line and position information contained in a position indicating packet on the packet multiplex line; and
exchanger means for receiving the packet on said packet multiplex line, identifying the terminal corresponding to the position indicating packet, and preparing a packet header necessary for sending the data packet corresponding to the identified terminal to a destination corresponding to the identified terminal, thereby effecting the exchange.

* * * * *